(12) United States Patent
Dettorre

(10) Patent No.: US 9,511,551 B2
(45) Date of Patent: Dec. 6, 2016

(54) DEVICE FOR EMBEDDING THREADS IN A RUBBER PROFILED ELEMENT COMPRISING A BLUNT-TIPPED ROTARY NEEDLE

(75) Inventor: Jean-Marie Dettorre, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 793 days.

(21) Appl. No.: 13/990,844

(22) PCT Filed: Nov. 22, 2011

(86) PCT No.: PCT/EP2011/070619
§ 371 (c)(1),
(2), (4) Date: Jul. 29, 2013

(87) PCT Pub. No.: WO2012/072443
PCT Pub. Date: Jun. 7, 2012

(65) Prior Publication Data
US 2013/0299547 A1     Nov. 14, 2013

(30) Foreign Application Priority Data
Dec. 2, 2010 (FR) ..................... 10 60017

(51) Int. Cl.
*B29C 70/54* (2006.01)
*B29D 30/06* (2006.01)
*B29D 30/66* (2006.01)

(52) U.S. Cl.
CPC ........... *B29C 70/54* (2013.01); *B29D 30/0678* (2013.01); *B29D 30/66* (2013.01); *B60C 2011/145* (2013.04); *Y10T 29/49833* (2015.01)

(58) Field of Classification Search
CPC ......... D05B 65/00; D05B 45/00; D05B 23/00; B29C 70/06; B29C 70/88; B29C 70/887
(Continued)

(56) References Cited

U.S. PATENT DOCUMENTS 5,158,027 A    10/1992   Ingram
5,186,776 A *   2/1993   Boyce .................. B29C 65/564
                                                       112/475.01
(Continued)

FOREIGN PATENT DOCUMENTS

EP        1213130 A2     6/2002
EP        1213383 A2     6/2002
WO   WO 2006/069912 A1   7/2006

OTHER PUBLICATIONS

International Search Report (PCT/ISA/210) issued on Feb. 17, 2012, by the European Patent Office as the International Searching Authority for International Application No. PCT/EP2011/070619.

*Primary Examiner* — Michelle Lopez
(74) *Attorney, Agent, or Firm* — Dickinson Wright PLLC

(57) ABSTRACT

Device for embedding an insert into a rubber profiled element in a given direction, is provided herein. The device includes:
  at least one means for feeding a thread continuously,
  a moving support capable of moving on a structure in a rectilinear reciprocating movement between a raised position and a lowered position,
  at least one hollow needle having a channel of longitudinal axis XX' inside which the thread is able to run, which needle is fixed by one of its ends to the base of the moving support and has at its other end a tip capable of penetrating said rubber profiled element, and
  a cutting means arranged on the support, having a blade capable of cutting off the thread.

14 Claims, 3 Drawing Sheets

(58) Field of Classification Search
USPC .... 227/64, 68, 79–80; 156/92, 93, 510, 538; 112/220, 475.01
See application file for complete search history.

(56) References Cited

U.S. PATENT DOCUMENTS

| | | | |
|---|---|---|---|
| 5,642,679 A * | 7/1997 | Monget | B29C 70/228 112/220 |
| 2002/0069503 A1 | 6/2002 | Sentmanat | |
| 2002/0069948 A1 | 6/2002 | Sentmanat | |
| 2008/0149260 A1 | 6/2008 | Orsat | |

* cited by examiner

DEVICE FOR EMBEDDING THREADS IN A RUBBER PROFILED ELEMENT COMPRISING A BLUNT-TIPPED ROTARY NEEDLE

BACKGROUND

1. Field

The invention relates to the technical field of vehicle tires and, in particular, to that of the manufacture of tires comprising fibres injected in a given direction into one of the rubber components of which said tire is made.

2. Description of Related Art

Publication EP 1 213 130 provides a specific idea of this type of tire, in which short reinforcing fibres, or inserts, are embedded in the tread in an oriented fashion so as to improve the mechanical properties of this part of the tire in a given direction.

Publication EP 1 213 383 proposes a means for embedding said inserts into a rubber component intended to be assembled to form a tire tread structure.

This device comprises a hollow needle capable of penetrating the rubber component, and inside which the reinforcing fibre runs, a moving support capable of performing a reciprocating movement and supporting said needle, a cutting blade for cutting off the fibre to be embedded, and at least two clamping means for maintaining and adjusting the position of the fibre. However, these clamping means have the effect of placing the reinforcing fibre under compression.

Application PCT/EP2010/062907, not published, describes an apparatus and a method for overcoming this compression problem.

This device for embedding an insert into a rubber profiled element in a given direction comprises:
- a means for feeding the thread continuously,
- a moving support capable of moving on a structure in a rectilinear reciprocating movement between a raised position and a lowered position,
- a hollow needle comprising a channel inside which said thread is able to run, which needle is fixed by one of its ends to the base of the moving support and comprising at its other end a tip capable of penetrating said rubber profiled element,
- a cutting means arranged on the structure, comprising a blade capable of cutting off the thread on each cycle of the reciprocating movement of the needle, when said tip is in a raised position so as to release a given length of thread constituting a tail at the outlet of the needle.

Still according to this publication, there is described a method of operating the device which comprises the following steps:
A—when the needle is in a raised position above the surface of the profiled element, a given length of thread is released on the tip side of said needle so as to constitute a tail,
B—the needle is lowered so as to cause the tip of said needle to penetrate the profiled element to a given depth,
C—the needle is extracted from the profiled element while allowing the thread to run inside the needle,
D—the tip of the needle is raised by a given height above the surface of the profiled element so as to release a length of thread between the tip of the needle and the surface of the profiled element,
E—the thread is cut off at the surface of the profiled element so as to release a new tail of given length.

On each cycle, the tail situated outside the needle on the tip side is driven into the profiled element. As the needle is raised again, the tail is held in position in the bottom of the perforation produced in the rubbery material which grips it, and which prevents the thread contained in the needle from rising back up, such that the raising movement allows the thread to be made to run along inside the needle.

During this movement, the portion of thread contained between the inlet of the needle and the tail is kept under tension. The thread is pulled through the needle rather than pushed as was proposed in the apparatus forming the subject matter of publication EP 1 213 383.

However, it is observed that, to make the needle penetrate the rubber profiled element, it is necessary to develop considerable forces which are not without consequence on the dimensioning of the needle and for the mechanisms to be employed to bring about its reciprocating movement. The effect of these forces is to deform the surface of the profiled element at the point of penetration of the needle, and they can moreover cause the needle to break, in particular when the angle of penetration of the needle into the profiled element is less than 90°.

SUMMARY

The object of the invention, which is an improvement of the device and the method described in application PCT/EP2010/062907, is to provide an original solution to the device as described in this application.

It appeared during an experimental procedure that rotating the needle at high speed made it possible to considerably reduce these forces.

However, in order that the rotation of the needle does not result in the part of the tail in contact with the edge of the tip being cut off, on the one hand, and in order to overcome the rotation of the thread, on the other hand, it has been demonstrated that, by blunting the profile of the tip in a controlled manner, said rotating tip could then slide freely on the thread, without cutting off the thread and without adversely affecting the ability of the needle to penetrate the profiled element.

In order to achieve this performance, it is necessary to adapt the geometric profile of the tip so as to avoid any slicing effect and any rotating effect. The profile of the tip is defined in such a way that, when cutting any radial profile of said tip into segments of 0.01 mm in length, the tangent at any point of a given segment forms an angle of less than 20° with the tangent at any other point of said segment, and at any point of the two segments adjacent to the given segment in question.

BRIEF DESCRIPTION OF DRAWINGS

The description which follows, and which has the object of highlighting the details of the invention, relies on an exemplary embodiment of the device and on FIGS. 1 to 5, in which.

DETAILED DESCRIPTION OF SPECIFIC EMBODIMENT

Figure 1:
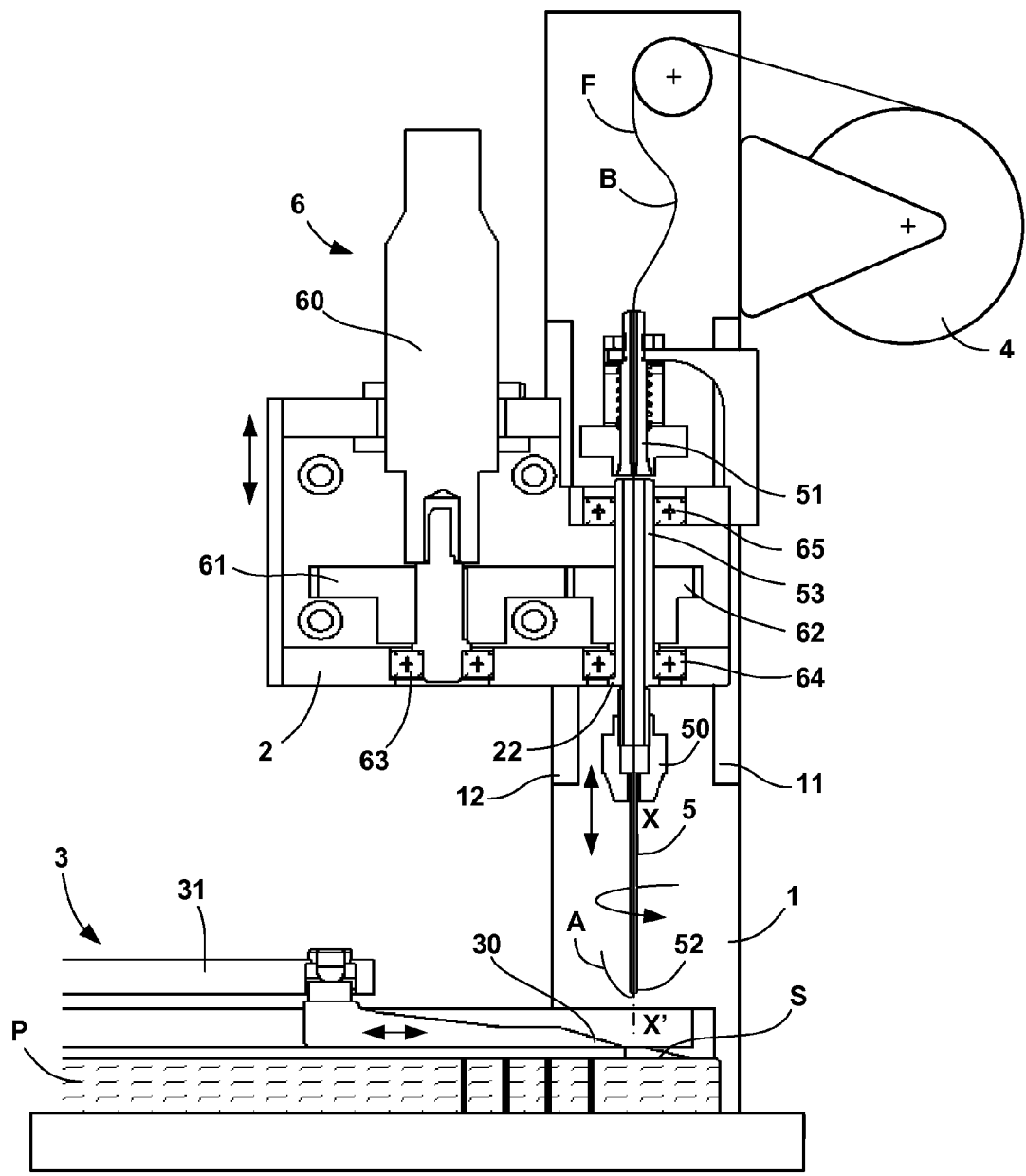
FIG. 1 depicts a schematic view of the device according to the invention.

The device according to the invention illustrated in FIG. 1 comprises a structure 1 on which are mounted a means or feeder 4 for feeding the thread F, a moving support 2 supporting a hollow needle 5, and a cutting means 3.

The feed means or feeder 4 is placed at the top of the structure 1 and is able to deliver the thread F at a given and regulated constant speed.

The moving support 2 is connected to the structure via rectilinear guide rails 11 and 12. This moving support 2 is given a reciprocating movement between a raised position and a lowered position, by a link rod and a crankshaft which are turned by a motor (not depicted) secured to the structure 1 and arranged on the other side thereof.

What is meant by the raised position is the position of the structure that corresponds to the phase of the cycle during which the structure is in the position furthest from the surface S of the profiled element P, and the lowered position means the position corresponding to the phase of the cycle during which the structure is in the position closest to the surface S.

A hollow needle 5, comprising a channel 53 through which the thread F runs, is fixed with the aid of a mandrel 50 by one of its ends to the base 22 of the moving support 2. The tip of the needle 52, from which the thread F emerges, is directed towards the surface S of the profiled element P. The needle describes the same upward and downward reciprocating movement as the support 2.

A cutting means 3, comprising a blade 30, is fixed to the lower portion of the structure 1. Under the action of an arm 31 connected to a motor (not shown), the cutting blade 30 effects a reciprocating movement in a direction parallel to the plane formed by the surface S of the profiled element P, so as to cut off the thread as closely as possible to said surface S.

If required, the cutting means 3 may be disengageable, so as to allow the embedding device to operate according to a particular mode, without having to carry out the cutting of the thread on each cycle, as will be explained below.

The means 6 capable of rotating the needle about its longitudinal axis XX' are mounted on the moving support 2. A motor 60 rotates a toothed reel 61 mounted on a bearing 63. This toothed wheel 61 is itself in engagement with a toothed pinion 62 carried by a hollow shaft 53 which is mounted freely in rotation about its axis XX' with respect to the moving support 2 via two bearings 64 and 65. The hollow shaft 53 supports, at its end placed at the base 22 of the moving support, the mandrel 50 on which the needle 5 is fixed. The rotation of the motor 61 causes the needle 5 to be rotated.

The speed of rotation of the motor 61 is adapted to obtain the desired perforation effect on the rubbery material. Specifically, it is observed that the high-speed rotation of the needle induces a heating of the elastomer layer immediately in contact with the external wall thereof. As a result of the friction between the needle and the rubber, the temperature of the walls of the needle and said elastomer layer rise quickly, the effect of which is to greatly reduce the viscosity of this thin elastomer layer, and to reduce in proportion the friction forces of the wall of the needle on the walls of the channel formed by the needle in the rubber profiled element. This effect is produced more perceptibly at the tip of the needle, at the point where the material is still cold.

During the continuous operation of the device, there is observed a stabilization of the temperature of the needle 5 which only accentuates its efficiency to perforate.

The result gained from this heating phenomenon is that the perforation effect of the needle is not obtained by the sharpening of the needle but by the plasticization of the material in contact therewith.

This effect makes it possible to solve the problems associated with the operation of the prior art devices in which the needle is not rotated. Even though these needles would be coupled with heating means capable of transmitting a certain quantity of heat to them, it is observed that the temperature of these needles decreases commensurately with their penetration into the cold rubbery material, thereby immediately reducing their efficiency. The needle is then trapped in the rubber, and the forces required to raise it again deform the geometry of the needle penetration well and randomize the position of the insert in the rubber.

This problem is solved by the mechanism according to the invention in which the heat supply is constant along the whole length of the penetration of the needle in the profiled element.

The speed of rotation of the needle becomes higher as the diameter of the needle decreases. In practice, the outside diameter of the needle is between 0.7 mm and 3 mm and corresponds to the diameters of the threads serving to produce the inserts.

The first favourable effects are manifested with a speed of 5 000 rev/min for a needle of 1.5 mm external diameter. However, for this type of needle, the operating speed experimentally giving the best results is of the order of 15 000 rev/min. For a needle of 0.7 mm diameter, this same optimal speed rises to 35 000 rev/min. Hence, to cover the range of requirements, the rotating means must ideally allow the needle to be rotated over a speed range ranging from 5000 rev/min to 50 000 rev/min for a current use of between 10 000 rev/min and 35 000 rev/min.

The implementation of the invention also makes it necessary to suitably modify the shape of the tip of the needle 5. Specifically, it should be ensured that the edge 52 of the tip does not cut off the thread during the rotation of the needle, which would have the effect of separating the tail A from the rest of the thread, and which would then reduce to nothing the function thereof which is, as has already been stated above, to maintain the thread in tension during the extraction of the needle from the profiled element.

Figure 3:
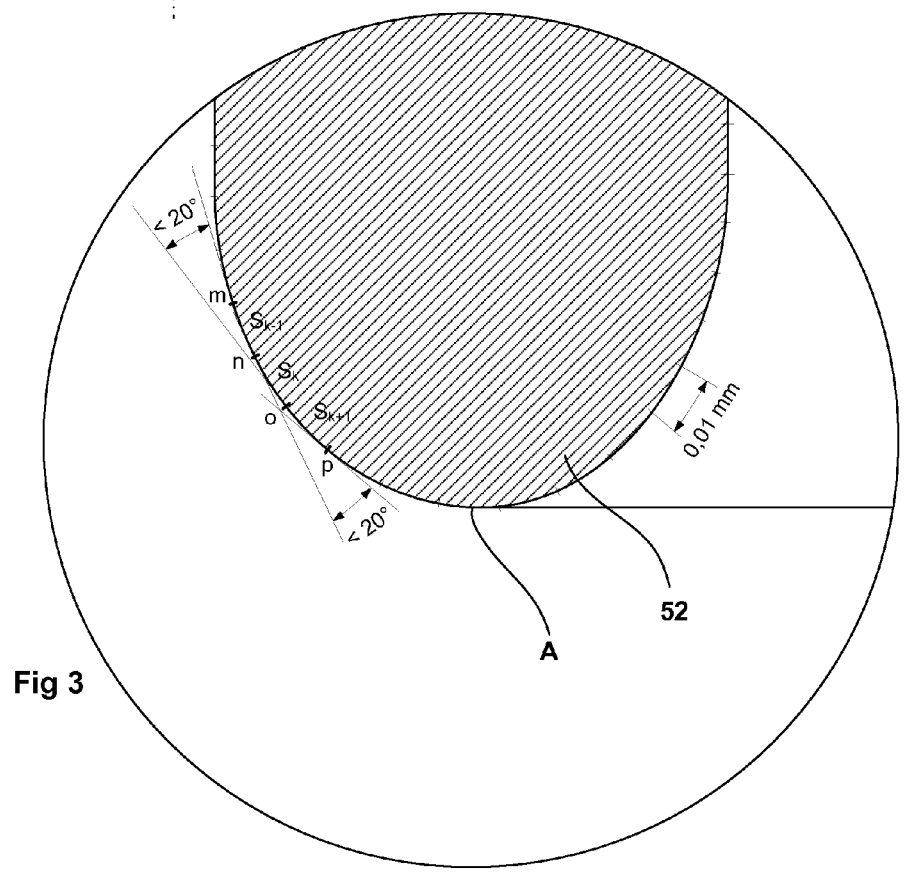

The tip 52 of the needle is then blunt, as is illustrated in FIG. 3, according to a rule defined to suit most of the threads adopted to serve as insert.

Figure 2:
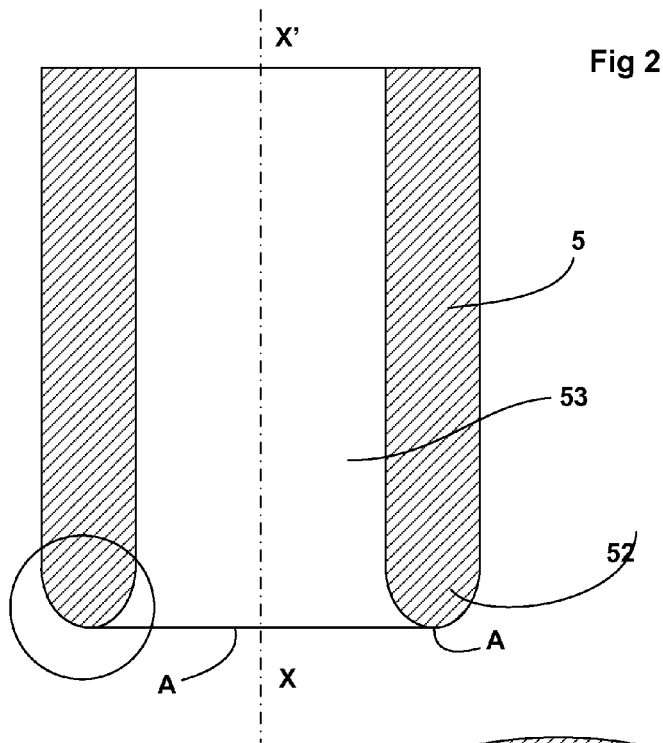
FIGS. 2 and 3 depict a view of the tip of the needle.

This rule, which has the object of avoiding cutting edges, has been obtained experimentally and can be readily understood by referring to FIG. 3, which is an enlargement of the radial section of the tip shown as an insert in FIG. 2.

To define the acceptable shape of this radial profile, said profile is cut into substantially equal segments, of 0.01 mm in length, progressing from the wall of the inner duct 53 to the outer wall of the needle.

It is then ensured that, for any given segment $S_k$, the tangent at any point of this segment $S_k$ forms an angle of less than 20° with the tangent at any other point of this segment $S_k$.

Moreover, the tangent at any point of this segment $S_k$ forms an angle of less than 20° with the tangent at any point of the segments $S_{k-1}$ and $S_{k+1}$ adjacent to the given segment $S_k$ in question.

In the example of FIG. 3, the segments $S_{k-1}$, $S_k$ and $S_{k+1}$ are delimited respectively by the points m, n, o and p. Thus, considering the segment $S_k$ and segment $S_{k-1}$, the tangents at the points o and m form between them an angle of less than 20°, and again considering the segment $S_k$ and the segment $S_{k+1}$, the tangents at the point n and at the point p form between them an angle of less than 20°.

In this way, and according to the rule above, the shape of the profile is not limited to the uniformly concave curvilinear profile represented in FIGS. 2 and 3, and may comprise rectilinear segments forming between them angles of less than 20° optionally combined with segments having concave, but also convex, profiles.

Figure 4:
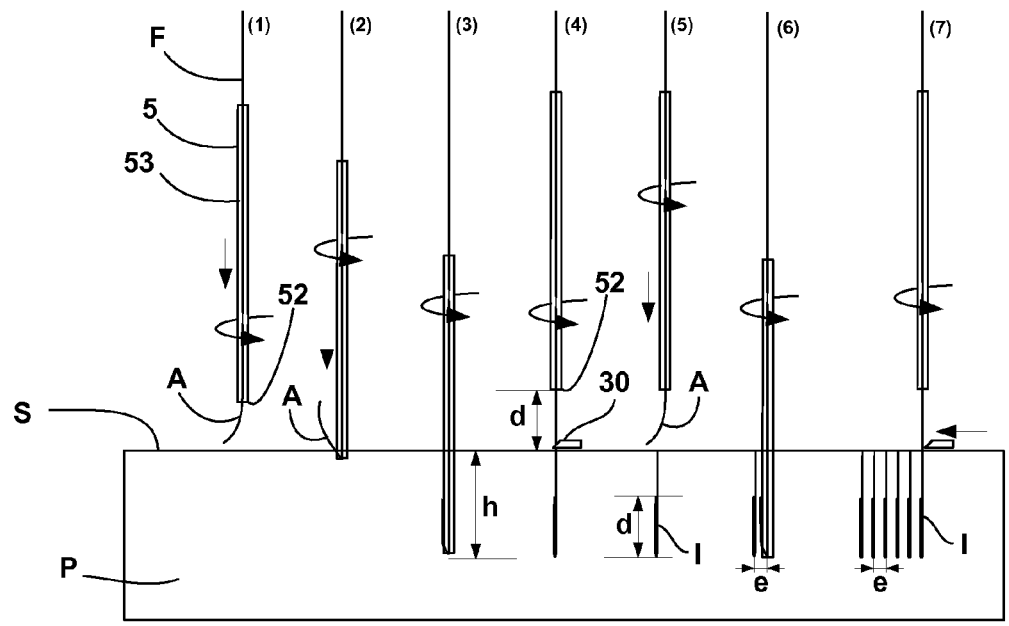
FIG. 4 depicts the various phases of the cycle of embedding an insert according to a first mode of use of the device.

The main positions of the operating cycle of the device according to the invention are detailed in FIG. 4 and are identified by numerals (1) to (6) placed between parentheses. Each cycle corresponds to the embedding of one insert I into the profiled element P.

The first position (1) corresponds to the raised position of the needle 5 as it starts its movement towards the lowered position. It will be observed that the free end of the thread F extends beyond the tip of the needle 52 to form a tail A.

The length of the tail A must not be too short, so that the expected effects as the needle rises again are produced. In practice, for the textile threads usually employed in the tire industry, it will be considered that the length of the tail may usefully be above 2 mm and preferably between 3 mm and 5 mm.

The second position (2) corresponds to the downwards movement of the needle 5 and to the moment at which the tip of the needle pierces the surface S of the rubber profiled element P.

It will be observed that at this precise moment, the tail A is folded back along the needle 5. In this configuration, the thread is immobilized between the external surface of the needle and the perforation formed in the rubbery profiled element, depriving the thread of any movement in the direction opposite to the direction of travel of the needle.

The third position (3) corresponds to the lowered position of the needle, in which position the tip of the needle penetrates the profiled element to a given depth h.

The needle then begins a movement of being raised back up from its lowered position to its raised position, illustrated in position (4). The raised position is reached when the tip of the needle is distant from the surface S of the profiled element P by a given and adjustable distance d.

During this raising movement, the free part of the thread and of the tail A are gripped by the rubbery material of the profiled element, allowing the thread F to be tensioned, and the needle rises up along the thread which remains fixed with respect to the surface S of the profiled element P.

When the raised position is reached, the blade 30 cuts off the thread as close as possible to the surface S and releases a tail A which is available for embedding the next insert I, as is illustrated by position (5).

The length d, which determines the length of the tail A, is adjusted by adjusting the travel limit of the moving support 2 when the latter is in the raised position. The depth h is adjusted by altering the amplitude of the movement of the moving support 2, and by adjusting the travel limit of the lowered position. The amplitude of the travel of the moving support corresponds to the depth h increased by the length d.

When the tail is cut off, the thread F receives a transverse impulse from the blade 30 of the knife 3, having the effect of forcing the free end of the thread constituting the tail to be folded back around the tip 52.

This movement of folding the tail around the tip 52 is enough to immobilize the movement, under the effect of inertia, whereby the thread rises back up inside the needle as the needle moves between the raised position illustrated at (5) and the position in which the tip again penetrates the surface S of the profiled element P, illustrated at (2).

In order to avoid the thread rising back up, steps are also taken to ensure that the tension in the thread as it enters the needle duct 25 is zero, by controlling the feed means 4 in such a way that the portion of thread that lies between the feed means 4 arranged on the structure 1, and the inlet of the hollow shaft 53, forms a loop B, irrespective of the position of the moving support 2, as is illustrated in FIG. 1.

Throughout the cycle, the needle is rotated by the motor 60. When the needle is in the raised position and the end of the thread is not retained by the rubbery material, the needle 5 and the hollow shaft 53 turn about the thread F, without the latter being rotated. To prevent the thread from being caught up by the friction of the thread on the end of the tip, it is usefully possible to arrange for the line A formed by the edge of the tip 52 to be arranged substantially in a plane perpendicular to the axis XX' of the needle 5. All the unevenness likely to move the thread away and to cause the inadvertent winding of the thread around the needle is thus prevented.

At the moment when the needle penetrates the profiled element, the tail is prevented from rotating by the surface of the channel formed by the needle. The lower edge of the needle around which the tail is folded slides on the thread without cutting it off, and the tail is driven into the profiled element to the depth h. When the needle is raised again, the thread is retained by the tail at the bottom of the well formed by the needle, and said needle rises again while turning about the thread without impairing the properties of the latter.

To improve the rising movement of the needle, it is possible to place on the structure 2 a means 51 for immobilizing the thread upstream of the hollow shaft 53 so as to prevent the rising of the thread in the event of an inadvertent tensioning of the part of the thread contained between the inlet of the thread into the hollow shaft 53 and the feed means 4. This immobilizing means also proves to be useful when the stiffness of the thread to be embedded is high and when the thread is able to offer a certain resistance to buckling when it is subjected to compression. In this scenario, when the end of the thread comes into contact with the surface of the profiled element, the thread cannot rise along the needle and the movement of the needle forces the tail to be folded back around the tip 52 before the latter penetrates the profiled element.

The next insert I is embedded by moving the profiled element by a pitch e relative to the structure 1, as is illustrated by position (6), and then by reproducing the cycle which has just been described.

By repeating these operations as many times as necessary, a rubber profiled element is obtained in which inserts I are embedded in a regular manner, such as is represented at position (7).

The insert, of length h, comprises at its base a turn-back of length d corresponding to the tail A. The presence of a double length of thread at the base of the insert has the advantage of preferably reinforcing the base of the tread block elements.

The cycle forming the subject of the present invention illustrates the case in which the inserts are embedded perpendicularly to the surface S of the profiled element P. This arrangement is not limiting, and it is entirely possible to provide a device comprising means for inclining the direction XX' of the needle with respect to the structure and to the plane of the surface S of the profiled element P.

Figure 5:
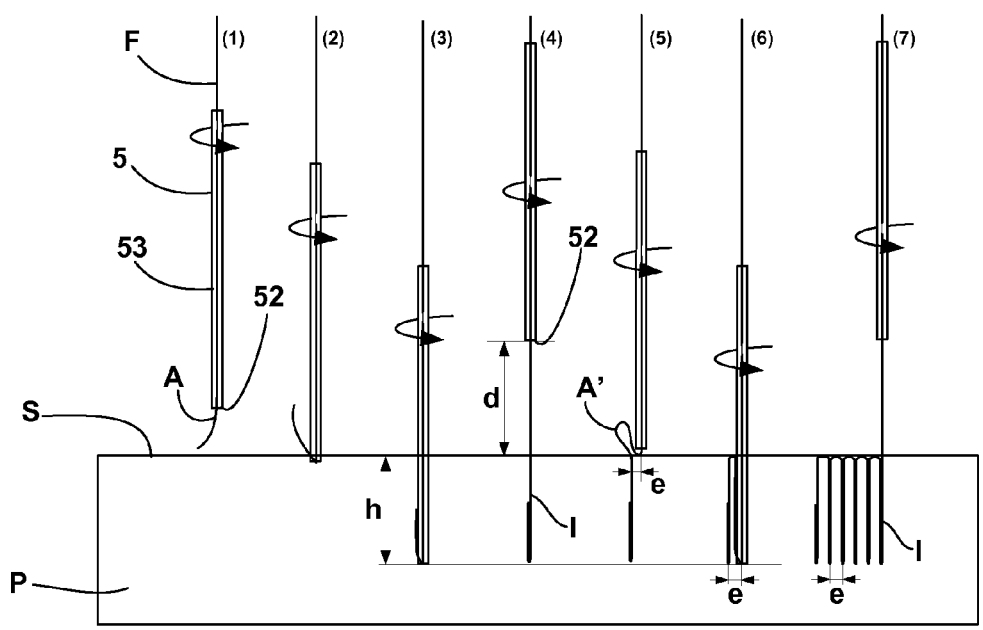
FIG. 5 depicts the various phases of the cycle of embedding an insert according to a second mode of use of the device.

FIG. 5 illustrates a particular example of implementing the device according to the invention which may prove to be advantageous when the aim is to increase the embedding speed.

In this configuration, the cutting of the thread upon each cycle of the needle is dispensed with and the cutting means is neutralized.

To start the embedding cycle, a tail A should, as beforehand, be released as is illustrated at step (1).

The needle penetrates the profiled element P (step (2)) to a depth h (step (3)).

At step (4), the needle then rises as far as the raised position in which the tip of the needle is distant from the surface S of the profiled element P by a distance e.

The profiled element is moved by a pitch e with respect to the structure 1 and the needle begins its cycle again.

It then suffices to ensure that the distance d is substantially greater than or equal to the depth h increased by the pitch e in order to release a loop A' serving as tail during the embedding of the next insert as is illustrated at step (5).

The successive inserts are embedded by reproducing the embedding cycle as many times as necessary as is illustrated by steps (6) and (7).

According to this second embodiment, the inserts comprise two strands of threads folded at the base of the insert, and two successive inserts are connected to one another by a strand of length e.

The preceding description of the device for implementing the invention applies to a device comprising a single needle. However, it will be readily understood that the principles described here can be applied to a device comprising a plurality of needles which are arranged on a common moving support performing said reciprocating movement and which are each connected to a means for feeding the thread continuously.

This specific arrangement makes it possible to embed a plurality of inserts on each cycle of the moving support and to pool the drive means and the cutting means. The toothed wheel 61 can be replaced by a toothed belt capable of driving all of the toothed pinions 62 carried by the hollow shafts 53 each supporting a needle 5 via a mandrel 50. In addition, the blade of the cutting means 3 is widened accordingly so as to cut off all of the threads upon each cycle.

The invention claimed is:

1. Device for embedding an insert into a rubber profiled element in a given direction, comprising:
   at least one feeder for feeding a thread continuously,
   a moving support capable of moving on a structure in a rectilinear reciprocating movement between a raised position and a lowered position, said moving support comprising a base,
   at least one hollow needle comprising a channel of longitudinal axis XX' inside which the thread is able to run, which needle is fixed by one of its ends to the base of the moving support and comprising at its other end a tip capable of penetrating said rubber profiled element,
   a cutting means arranged on the support, comprising a blade capable of cutting off the thread leaving the tip of the needle on each cycle of the reciprocating movement of the needle, when said tip is in a raised position so as to release a given length of thread constituting a tail at the outlet of the needle,
   wherein the moving support comprises means capable of rotating the needle about its longitudinal axis XX', and wherein the tip of said needle is blunt, such that when cutting any radial profile of said tip into segments of 0.01 mm in length, the tangent at any point of a given segment ($S_k$) forms an angle of less than 20° with the tangent at any other point of said segment ($S_k$) and at any segments ($S_{k-1}$, $S_{k+1}$) being adjacent to said segment ($S_k$), the tangent at any point of said segment ($S_k$) forms an angle of less than 20° with the tangent at any point of the segments ($S_{k-1}$, $S_{k+1}$).

2. Device according to claim 1, wherein the tip comprises a line forming the edge (A) of said tip, said line is arranged substantially in a plane perpendicular to the axis (XX') of the needle.

3. Device according to claim 1, wherein the means for rotating the needle are capable of rotating said needle at a speed of between 5000 revolutions/min and 50 000 revolutions/min and usually between 10 000 rev/min and 35 000 rev/min.

4. Device according to claim 1, wherein the outside diameter of the needle is between 0.7 mm and 3 mm.

5. Device according to claim 1, wherein the cutting means is a knife with a reciprocating movement moving in a plane.

6. Device according to claim 1, wherein the cutting means is disengageable.

7. Device according to claim 1, in which the needle is combined with an immobilizer for immobilizing the thread that is arranged on the moving support and capable of preventing the thread from running in the needle in a direction opposite to the feed direction.

8. Device according to claim 1, in which the channel of the needle comprises an inlet, the feeder is connected to a controller capable of maintaining the thread portion situated between said feeder and at a zero tension whatever the position of the moving support.

9. Device according to claim 1, wherein the direction (XX') of the needle is inclined with respect to the structure.

10. Device for embedding a thread or a plurality of threads into a rubber profiled element in a given direction, comprising
    a moving support capable of moving on a structure in a rectilinear reciprocating movement between a raised position and a lowered position, said moving support comprising a base,
    a plurality of hollow needles comprising a channel of longitudinal axis XX' inside which a thread is able to run, which needles are each fixed by one of their ends to the base of the moving support and comprising at the other end a tip capable of penetrating said rubber profiled element,
    a plurality of feeders for feeding thread capable of feeding each needle continuously,
    a cutting means arranged on the structure, comprising a blade capable of cutting off the threads leaving the tip of each of the needles on each cycle of the reciprocating movement, so as to release a given length of thread constituting a tail at the outlet of each of the needles,
    wherein the moving support comprises means capable of rotating each of the needles about its longitudinal axis XX', and in that the tip of each of the needles is blunt such that, when cutting any radial profile of said tip into segments of 0.01 mm in length, a given segment ($S_k$) having two adjacent segments ($S_{k-1}$, $S_{k+1}$), the tangent at any point of a given segment ($S_k$) forms an angle of less than 20° with the tangent at any point of the adjacent segments (Sk−1, Sk+1).

11. Method of embedding an insert formed by a thread portion into a rubber profiled element via one of its surfaces, using a device according to claim 1, comprising one or more needles, in which each of the needles describes the steps during which:

- A—when the needle is in a raised position above the surface of the profiled element, releasing a given length of thread on the tip side so as to constitute a tail,
- B—lowering the tip of the needle so as to cause the tip of said needle to penetrate the profiled element to a given depth which is greater than the length of the tail,
- C—extracting the needle from the profiled element while allowing the thread to run inside the needle,
- D—raising the tip of the needle by a given height above the surface of the profiled element so as to release a length of thread between the tip of the needle and the surface of the profiled element,
- E—cutting the thread off at the surface of the profiled element using a cutting means so as to release a new tail of given length, wherein the needle is rotated about its longitudinal axis.

12. Method according to claim 11, in which the needle is rotated at a speed of between 5000 revolutions/min and 50 000 revolutions/min.

13. Method according to claim 11, in which, following step E:

- F—moving the profiled element by a given pitch with respect to the structure so as to embed another insert.

14. Method according to claim 13, wherein the cutting means is neutralized so as to eliminate step E, and wherein the tip of the needle is raised above the surface of the rubber profiled element by a height substantially equal to the depth, increased by the length of the pitch, so as to form a new tail.

\* \* \* \* \*